(12) United States Patent
White et al.

(10) Patent No.: US 12,529,405 B2
(45) Date of Patent: Jan. 20, 2026

(54) CAMSHAFT ROTATION SENSOR MOUNTING ARRANGEMENT

(71) Applicant: Hendrickson USA, L.L.C., Schaumburg, IL (US)

(72) Inventors: Jay D. White, Lenoir, NC (US); Matthew G. Chapman, Canal Fulton, OH (US); Jeffrey R. Wittlinger, Uniontown, OH (US); Francisco J. Arevalo, Joliet, IL (US); Kurtis R. Bowen, Barrington, IL (US); Nathan A. Nicholas, Akron, OH (US); Jeff R. Zawacki, Channahon, IL (US); Dhawal P. Dharaiya, Twinsburg, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 516 days.

(21) Appl. No.: 17/859,295

(22) Filed: Jul. 7, 2022

(65) Prior Publication Data
US 2023/0010201 A1 Jan. 12, 2023

Related U.S. Application Data

(60) Provisional application No. 63/220,133, filed on Jul. 9, 2021.

(51) Int. Cl.
*F16D 66/00* (2006.01)
*F16D 65/22* (2006.01)
*F16D 125/30* (2012.01)

(52) U.S. Cl.
CPC ............. *F16D 66/00* (2013.01); *F16D 65/22* (2013.01); *F16D 2066/003* (2013.01); *F16D 2125/30* (2013.01)

(58) Field of Classification Search
CPC ...... F16D 2125/30; F16D 65/22; F16D 65/52; F16D 65/562; F16D 66/02; F16D 2066/003; F16D 66/025; F16D 2300/18; F16D 27/004; F16D 66/00; Y10T 403/1616; B60T 17/22
See application file for complete search history.

(56) References Cited

U.S. PATENT DOCUMENTS 5,207,299 A * 5/1993 Feldmann ............. F16D 66/026
188/1.11 R
5,226,509 A 7/1993 Smith
(Continued)

FOREIGN PATENT DOCUMENTS

CN 105508476 B * 11/2017
CN 107816500 A * 3/2018
(Continued)

*Primary Examiner* — Robert A. Siconolfi
*Assistant Examiner* — Mahbubur Rashid
(74) *Attorney, Agent, or Firm* — Dureska & Moore, LLC; David P. Dureska; Benjamin J. Chojnacki

(57) ABSTRACT

A sensor mounting arrangement for a drum brake assembly of a heavy-duty vehicle comprising a sensor assembly mounted on a cam tube of the drum brake assembly. The cam tube is formed with an opening. The sensor assembly includes a detector that is at least partially disposed in or adjacent to the opening of the cam tube and a target that is disposed about an outer surface of a camshaft of the drum brake assembly.

4 Claims, 13 Drawing Sheets

(56) References Cited

U.S. PATENT DOCUMENTS

| | | | | |
|---|---|---|---|---|
| 5,253,735 | A | * | 10/1993 | Larson ................. F16D 66/025 324/207.2 |
| 5,263,556 | A | * | 11/1993 | Frania .................... F16D 65/60 188/196 D |
| 6,105,730 | A | * | 8/2000 | Ekeroth ............... F16D 66/025 324/207.2 |
| 6,240,806 | B1 | | 6/2001 | Morris et al. |
| 6,273,218 | B1 | | 8/2001 | Kramer |
| 7,537,224 | B2 | | 5/2009 | Morris et al. |
| 8,844,482 | B2 | * | 9/2014 | Heywood ............... F01L 1/344 123/90.27 |
| 9,353,814 | B2 | * | 5/2016 | Seglo .................... F16D 66/025 |
| 9,447,832 | B2 | | 9/2016 | Bishop et al. |
| 9,605,724 | B2 | | 3/2017 | Okuma |
| 10,197,123 | B2 | | 2/2019 | Drake |
| 2006/0033382 | A1 | | 2/2006 | Steph et al. |
| 2009/0050418 | A1 | * | 2/2009 | Vargas ................. F16D 66/025 188/1.11 L |
| 2013/0068180 | A1 | * | 3/2013 | Heywood ................ F01L 9/20 123/90.11 |
| 2015/0377311 | A1 | * | 12/2015 | Okuma ................. F16D 65/22 188/1.11 E |

FOREIGN PATENT DOCUMENTS

| | | | | |
|---|---|---|---|---|
| CN | 207583901 U | * | 7/2018 | ........... F16D 66/025 |
| CN | 207661030 U | * | 7/2018 | |
| CN | 110469606 A | * | 11/2019 | |
| CN | 211117280 U | * | 7/2020 | |
| CN | 212690654 U | * | 3/2021 | |
| DE | 4017951 A1 | * | 12/1991 | |
| KR | 101766919 B1 | * | 8/2017 | |
| WO | 2010003244 | | 1/2010 | |
| WO | 2020236391 | | 11/2020 | |

\* cited by examiner

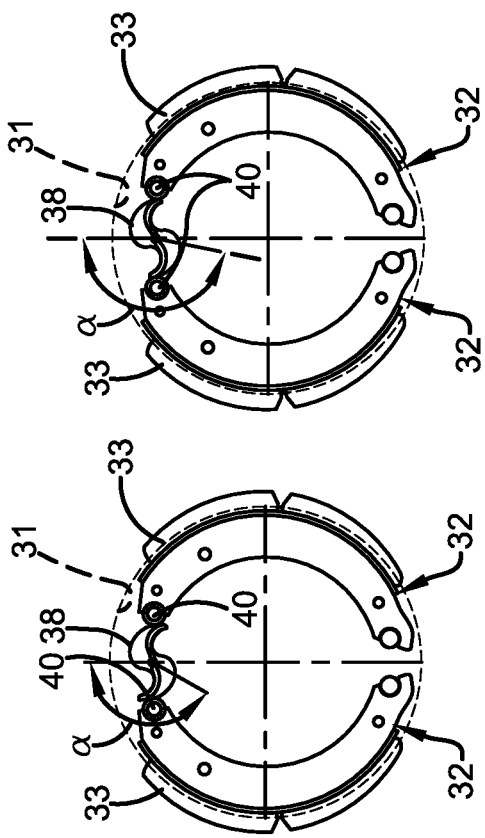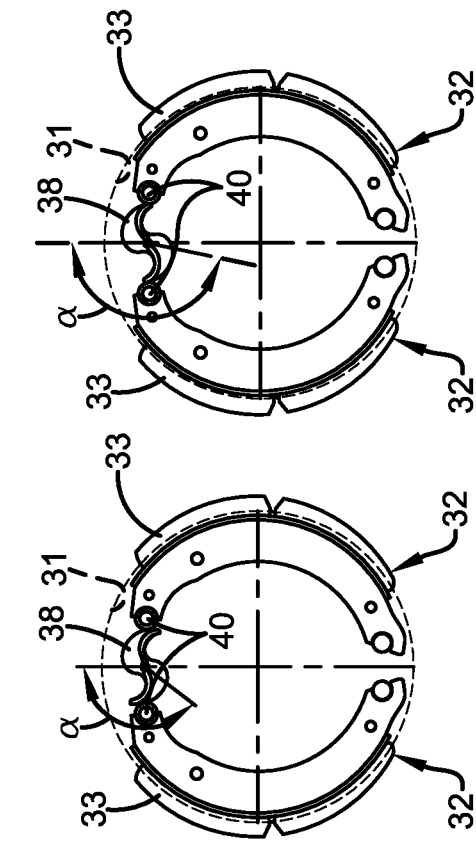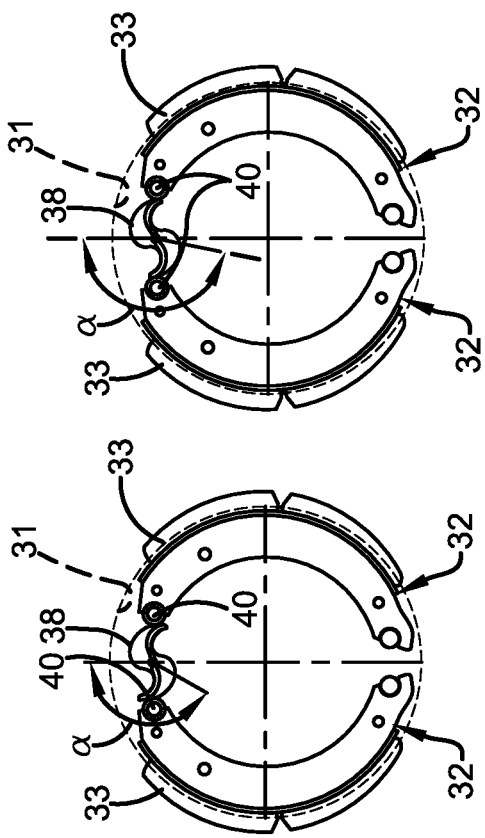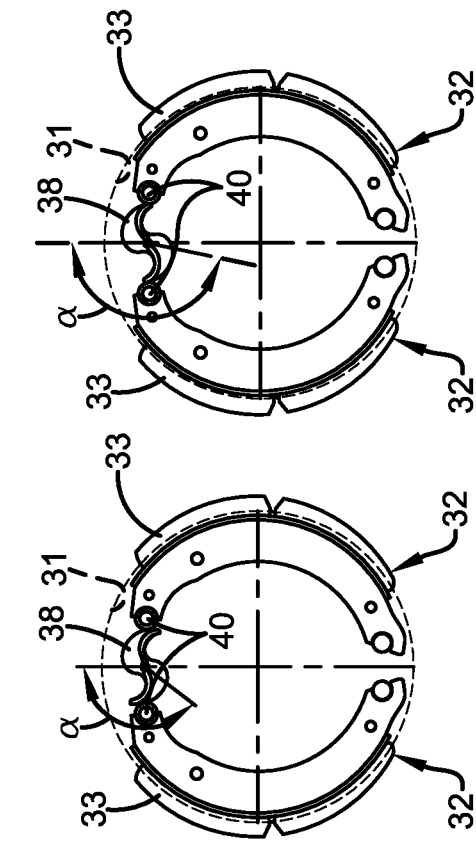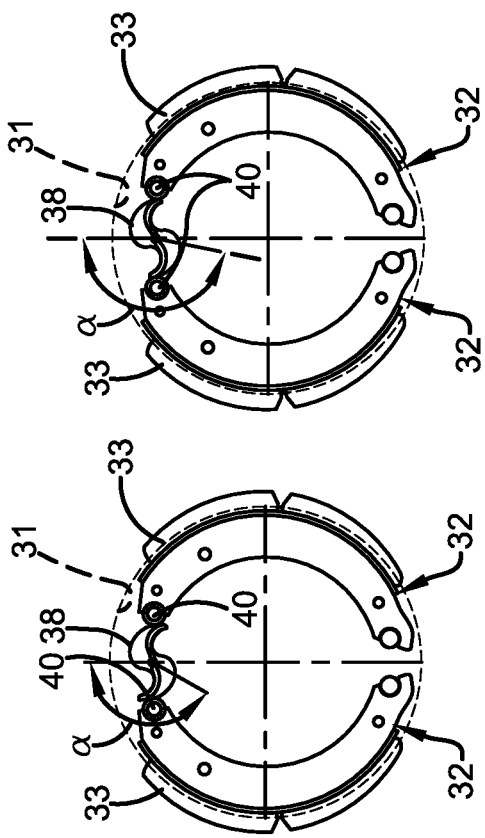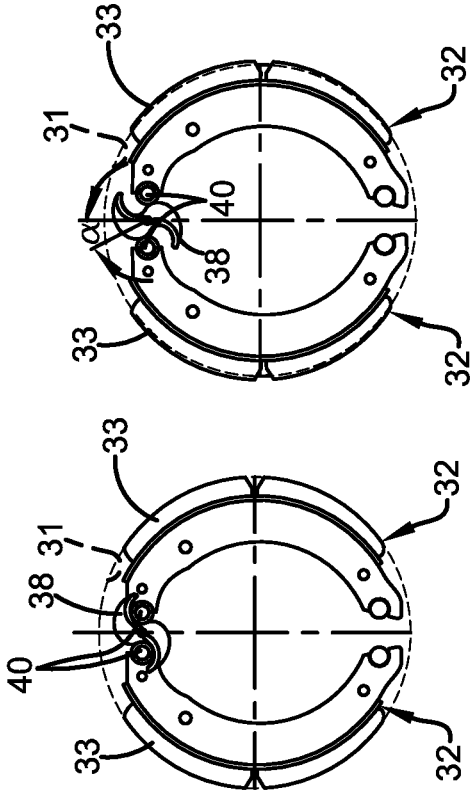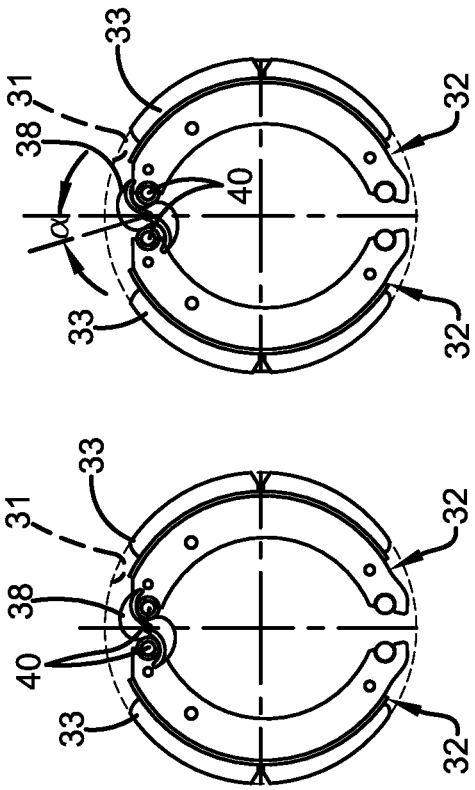

CAMSHAFT ROTATION SENSOR MOUNTING ARRANGEMENT

CROSS-REFERENCE TO RELATED APPLICATION

This application claims the benefit of U.S. Provisional Patent Application No. 63/220,133, filed Jul. 9, 2021.

BACKGROUND

Technical Field

The present invention relates generally to the art of braking systems for heavy-duty vehicles. In particular, the present invention relates to braking systems for heavy-duty vehicles that utilize drum brakes. More particularly, the present invention relates to a sensor mounting arrangement for measuring camshaft rotation during braking and total camshaft rotation utilizing a sensor at least partially mounted within a cam tube of the drum braking system, thereby providing a sensor mounting arrangement that is robust, accurate, and minimally disruptive to the assembly and maintenance of the brake system.

Background Art

The use of braking systems on heavy-duty vehicles is well known. For the purposes of clarity and convenience, reference is made to a heavy-duty vehicle with the understanding that such reference includes trucks, tractor-trailers or semi-trailers, trailers, and the like. Common types of braking systems for heavy-duty vehicles typically include disc brake systems and drum brake systems.

Drum brake systems are generally incorporated into an axle/suspension system and typically include a brake drum mounted on a wheel hub of a wheel end assembly rotatably mounted on an outboard end of the axle. The brake drum typically includes a pair of brake shoes housed within the brake drum. Each brake shoe has a sacrificial, high coefficient of friction brake lining that is mounted on a metal backing plate, or shoe table, and maintained in a radially-spaced relationship from the interior braking surface of the brake drum. An S-cam attached to the outboard end of a camshaft of a cam shaft assembly of the drum brake system engages a pair of rollers, each roller being connected to an end of a respective brake shoe. Drum brake systems may also include a slack adjuster attached to the inboard splined end of the camshaft.

When an operator of the heavy-duty vehicle applies the vehicle brakes, compressed air is communicated from an air supply source, such as a compressor and/or air tank, through air conduits or lines to a brake chamber, as is known. The brake chamber converts the air pressure into mechanical force and moves a pushrod. The pushrod, in turn, moves the slack adjuster, causing rotation of the camshaft and S-cam, forcing the brake linings against the interior braking surface of the brake drum, thereby creating friction and slowing or stopping the heavy-duty vehicle. Once the operator of the heavy-duty vehicle releases the brakes, the camshaft, and thus the S-cam, rotate back, allowing the radially-spaced relationship between the brake lining and interior braking surface of the brake drums to be re-established. The slack adjuster maintains the preset distance or clearance between the brake lining and the interior braking surface of the brake drum as the brake lining wears.

In order to prevent potentially unsafe conditions and to ensure timely maintenance of components of the drum braking system at individual wheel ends, prior art sensor mounting arrangements have been utilized. More specifically, because camshaft rotation is proportional to the stroke of the push rod generated by the brake air chamber, prior art sensor mounting arrangements generally utilize external components added to the splined end or to the S-cam of the camshaft, attached to the slack adjuster, or disposed within the slack adjuster to measure rotation of the camshaft.

However, the prior art sensor mounting arrangements have disadvantages, drawbacks, and limitations. In particular, numerous manufacturers have designed prior art sensor mounting arrangements utilizing proprietary sensing devices integrated into their slack adjuster. While third party sensors are available, they typically only fit with specific commercially-available slack adjuster styles or can only be adaptable to attach directly to the S-cam, a modified inboard end of the camshaft, or the axle or other components of the suspension system. More particularly, these prior art sensor mounting arrangements are generally positioned in areas exposed to potential impact damage; areas that interfere with or add complexity to assembly, disassembly, and/or maintenance of the drum braking system and heavy-duty vehicle; and/or areas that potentially expose the sensing devices to environmental conditions, such as extreme temperatures, that potentially negatively affect the accuracy and service-life of the sensing device. In addition, some prior art sensor mounting arrangements have limited functionality. In particular, some prior art sensor mounting arrangements are capable of indicating the length of the stroke of the pushrod generated by the brake air chamber but lack the capability of predicting brake lining wear limits or available lift of the S-cam.

Thus, there is a need in the art for a sensor mounting arrangement that is separate from and can be utilized with any commercially available slack adjuster, that accurately monitors camshaft rotation during braking as well as total camshaft rotation during camshaft indexing to compensate for wear of the brake lining, that is positioned away from potential impact damage and environmental exposure, and that does not interfere with or add complexity to maintenance and assembly of the drum brake system.

SUMMARY OF THE INVENTION

Objectives of the present invention include providing a sensor mounting arrangement that is separate from and usable with any commercially-available slack adjuster.

A further objective of the present invention is to provide a sensor mounting arrangement that accurately monitors camshaft rotation during braking and total camshaft rotation during indexing and brake lining consumption.

Yet another objective of the present invention is to provide a sensor mounting arrangement that is located away from potential impact damage and exposure to environmental conditions.

Still another objective of the present invention is to provide a sensor mounting arrangement that does not interfere with or add complexity to maintenance and assembly of the drum braking system.

These objectives and advantages are obtained by the sensor mounting arrangement for a drum brake assembly of a heavy-duty vehicle comprising a sensor assembly mounted on a cam tube of the drum brake assembly. The cam tube is formed with an opening. The sensor assembly includes a detector that is at least partially disposed in or adjacent to the opening of the cam tube and a target that is disposed about an outer surface of a camshaft of the drum brake assembly.

BRIEF DESCRIPTION OF THE SEVERAL VIEWS OF THE DRAWINGS

The preferred embodiments of the present invention, illustrative of the best mode in which applicants have contemplated applying the principles, is set forth in the following description and is shown in the drawings, and is particularly and distinctly pointed out and set forth in the appended claims.

FIG. 3A is a diagrammatic view, in section, of the drum brake assembly shown in FIGS. 1-2, showing the brake drum inner surface as a dashed circle and demonstrating the rotational position of the S-cam when new brake shoes with extended service brake linings are in a collapsed position;

FIG. 3B is a diagrammatic view, in section, of the drum brake assembly shown in FIGS. 1-2, showing the brake drum inner surface as a dashed circle and demonstrating the rotational position of the S-cam when new brake shoes with standard service brake linings are in a collapsed position;

FIG. 3C is a diagrammatic view, in section, of the drum brake assembly shown in FIG. 3A, demonstrating the rotational position of the S-cam when new brake shoes with extended service brake linings have been adjusted for clearance;

FIG. 3D is a diagrammatic view, in section, of the drum brake assembly shown in FIG. 3B, demonstrating the rotational position of the S-cam when new brake shoes with standard service brake linings have been adjusted for clearance;

FIG. 3E is a diagrammatic view, in section, of the drum brake assembly shown in FIGS. 3A and 3C, demonstrating the rotational position of the S-cam when new brake shoes with extended service brake linings are in a worn-out condition;

FIG. 3F is a diagrammatic view, in section, of the drum brake assembly shown in FIGS. 3B and 3D, demonstrating the rotational position of the S-cam when new brake shoes with standard service brake linings are in a worn-out condition;

FIG. 3G is a diagrammatic view, in section, of the drum brake assembly shown in FIGS. 3A, 3C, and 3E, demonstrating the rotational position of the S-cam when new brake shoes with extended service brake linings are approaching tip-over or S-cam flip;

FIG. 3H is a diagrammatic view, in section, of the drum brake assembly shown in FIGS. 3B, 3D, and 3F, demonstrating the rotational position of the S-cam when new brake shoes with standard service brake linings are approaching tip-over or S-cam flip;

Similar characters refer to similar parts throughout.

DESCRIPTION OF THE PREFERRED EMBODIMENT

Figure 1:
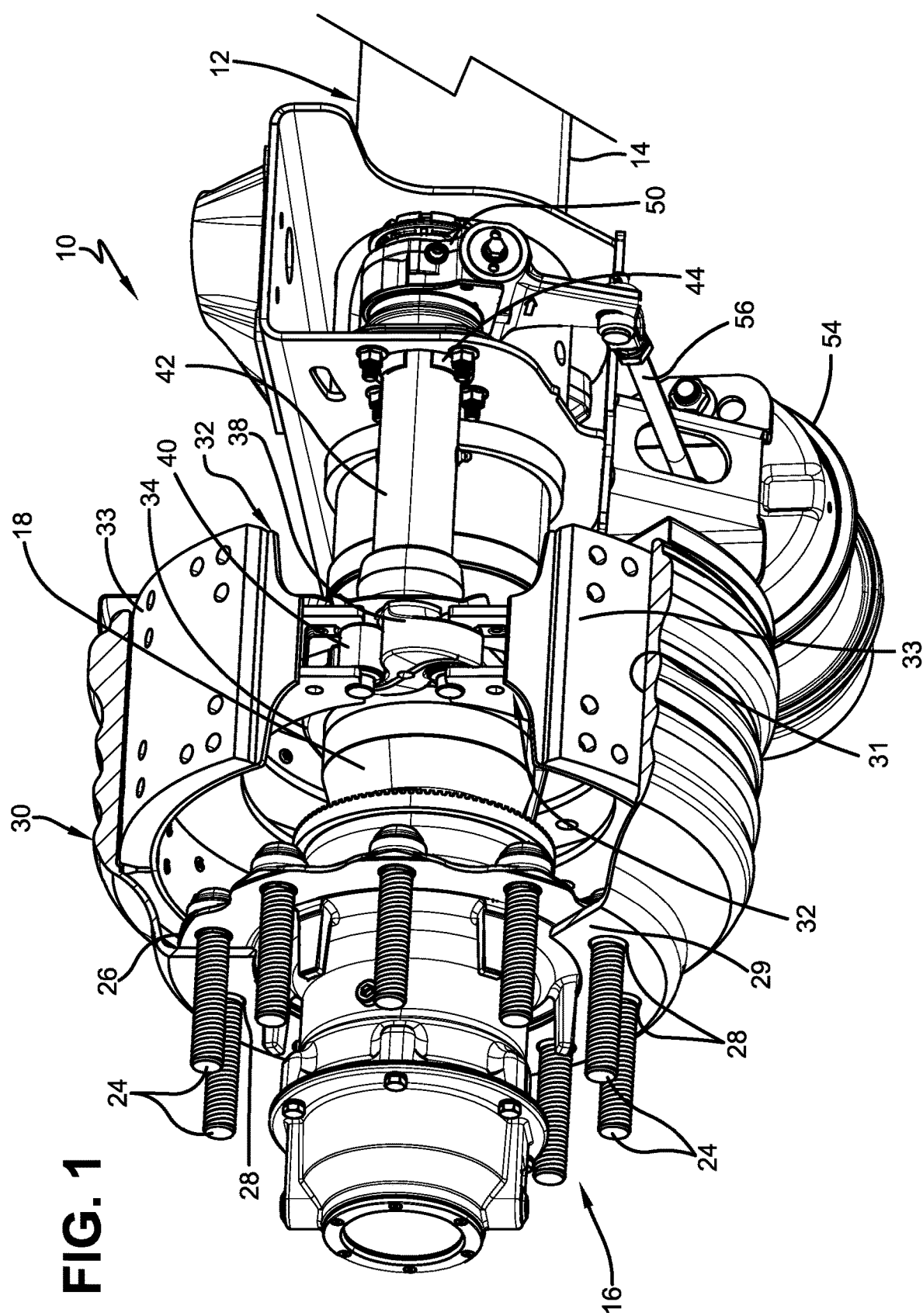
FIG. 1 is a partial perspective view, partially in section, of a drum brake assembly incorporated into an axle/suspension system.
Figure 2:
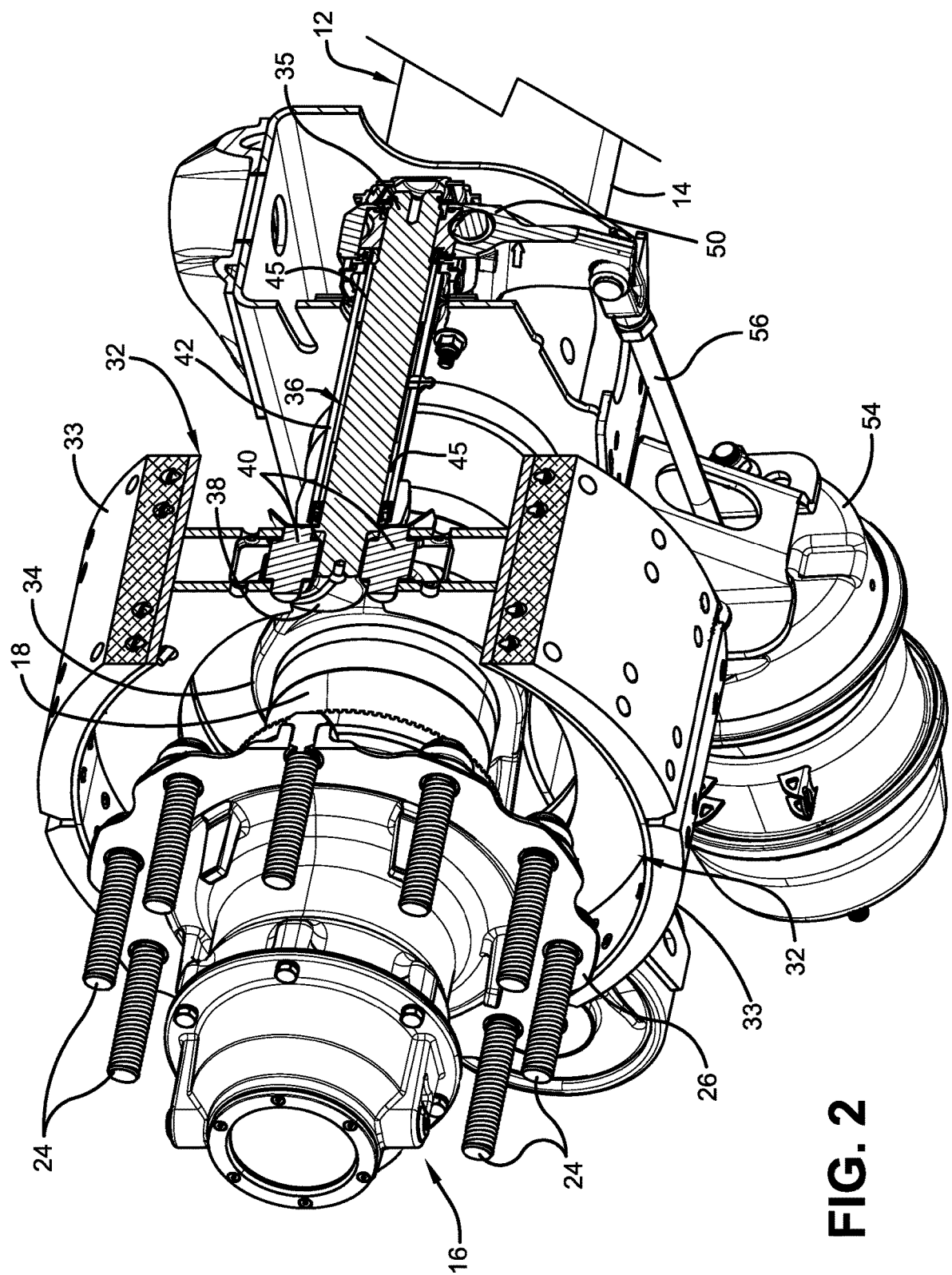
FIG. 2 is a partial perspective view, partially in section, of the drum brake assembly shown in FIG. 1, with the brake drum removed and showing the camshaft disposed within the cam tube.
Figure 4:
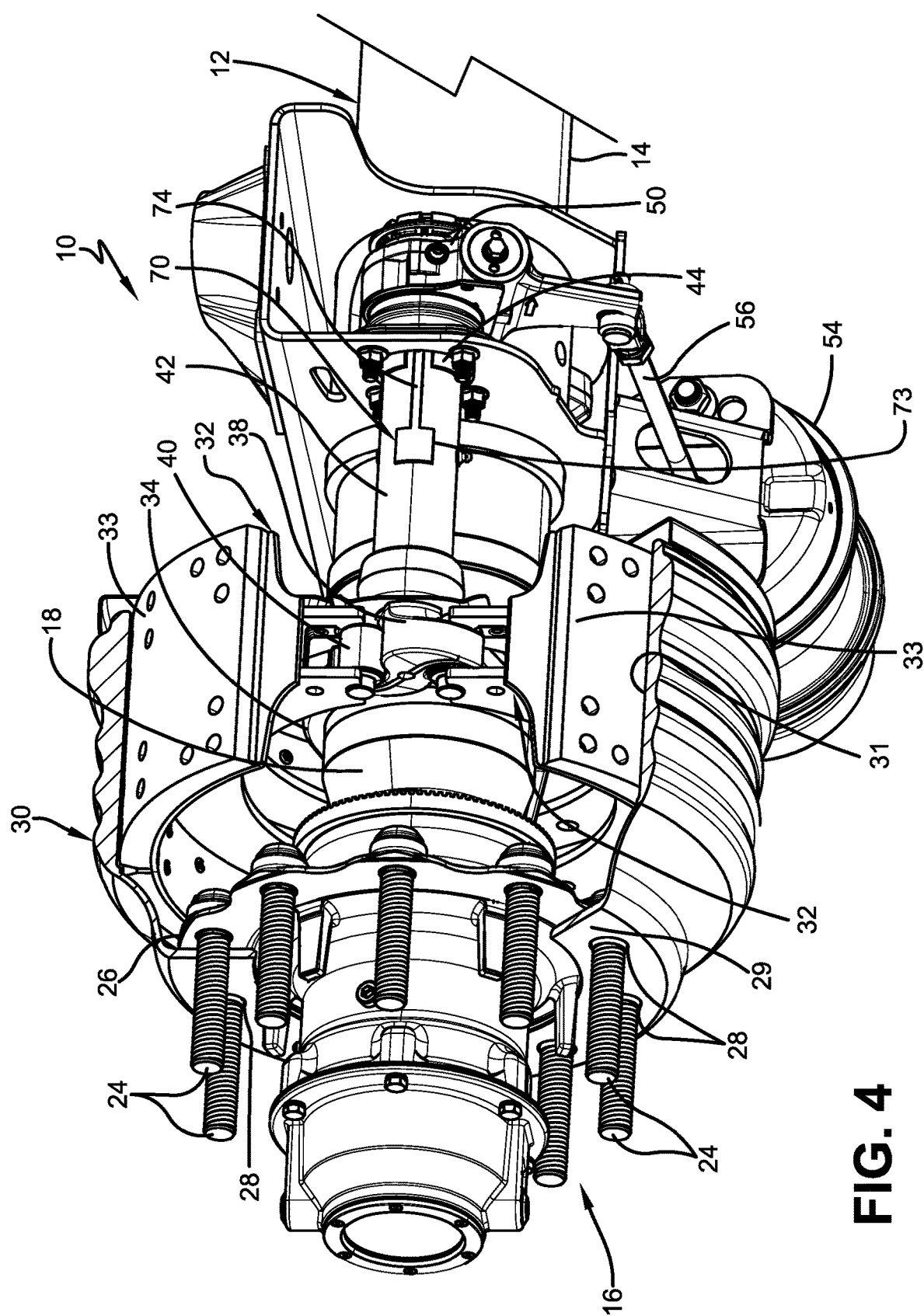
FIG. 4 is a partial perspective view, partially in section, of a drum brake assembly incorporated into an axle/suspension system and including an exemplary embodiment camshaft rotation sensor mounting arrangement, according to the present invention.
Figure 5:
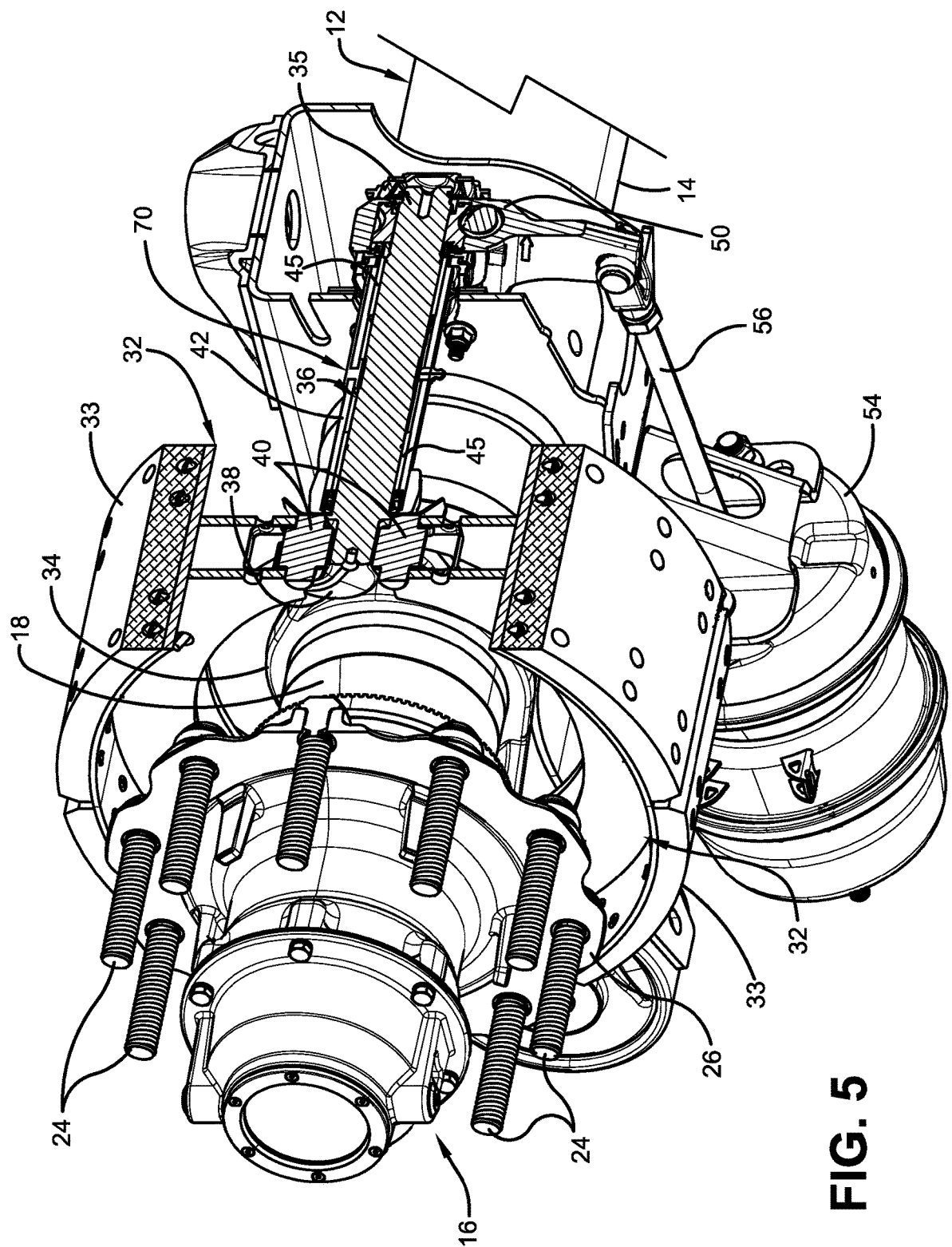
FIG. 5 is a perspective view, partially in section, of the drum brake assembly shown in FIG. 4, showing the brake drum removed and the camshaft in section.

In order to better understand the sensor mounting arrangement of the present invention and the environment in which it operates, a drum brake assembly 10 (FIGS. 1-2) is shown mounted on an axle 12 (partially shown) of an axle/suspension system (not shown) of a heavy-duty vehicle (not shown).

Axle 12 includes a central tube 14 having a pair of axially opposite ends with respective spindles 18 (only one shown) rigidly connected by any suitable method, such as welding, to the respective ends of the central tube. A pair of wheel end assemblies 16 (only one shown) having respective wheel hubs 26 (only one shown) are rotatably mounted on the respective spindle 18.

Drum brake assembly 10 includes a brake support structure or brake spider 34 and a brake drum 30. Brake spider 34 is rigidly mounted on central tube 14 of axle 12 adjacent wheel hub 26 of wheel end assembly 16, as is known. Brake drum 30 is typically formed from gray iron as a single casting and includes an inner braking surface 31. A mounting flange 29 extends radially inward from the outboard end of brake drum 30 and includes a plurality of openings 28 for receiving respective interference-fit studs 24 of wheel hub 26 for mounting the brake drum, as is known.

Drum brake assembly 10 also includes a pair of brake shoes 32. Brake shoes 32 each have a brake lining 33 generally formed from a frictional material and having a convex outer surface for engaging inner surface 31 of brake drum 30, as is known. An end of each brake shoe 32 is retained against a respective roller 40 that is in contact with an actuator or S-cam 38 integrally formed with or attached to an outboard end of a camshaft 36 (FIG. 2) of drum brake assembly 10, as is known.

Camshaft 36 is rotatably disposed within a cam tube 42 by a pair of camshaft bushings 45 disposed at axially opposite ends of the cam tube. Cam tube 42 is held in position axially and circumferentially by frictional cam tube brackets 44 (FIG. 1) (only one shown), which, in turn, connect the cam tube to axle 12 or other components of the axle/suspension system. A slack adjuster 50 is positioned on and mechanically engages with an inboard splined end 35 (FIG. 2) of camshaft 36. Slack adjuster 50 is also connected to a brake air chamber 54 by a pushrod 56. Slack adjuster 50 maintains the distance between inner surface 31 of brake drum 30 and brake linings 33 of brake shoes 32 such that the brake linings do not contact or drag against the inner surface of the drum when drum brake assembly 10 is not actuated. Slack adjuster 50 also maintains the distance between inner surface 31 of drum 30 and brake linings 33 such that the distance is not so great as to allow excessive stroke of pushrod 56, which could potentially cause the brake lining to lift out of the brake drum during actuation of drum brake assembly 10.

During operation, when drum brake assembly 10 is actuated, air pressurizes air chamber 54 creating a proportional force that is transmitted by pushrod 56, acting on slack adjuster 50 to produce torque about and cause rotation of the slack adjuster and, thus, camshaft 36. S-cam 38 rotates with camshaft 36, engaging rollers 40, forcing the rollers and brake shoes 32 in a radially-outward direction, allowing brake linings 33 to contact inner surface 31 of brake drum 30, thereby causing friction to slow or stop the heavy-duty vehicle. Rotational displacement of slack adjuster 50 and camshaft 36 continues until the deflections caused by the rotational forces equilibrate. When actuation of drum brake assembly 10 ceases, camshaft 36 rotates back, allowing brake shoes 32 to move radially inward of inner surface 31, as is known.

The rotational displacement of slack adjuster 50 causes rotation of camshaft 36 in such a manner that camshaft rotation is generally proportional to the stroke of pushrod 56 generated by air chamber 54, as is known. As such, determination and prediction of the rotation of camshaft 36 can be used to determine and/or predict the actual stroke of pushrod 56 during actuation of brake assembly 10 as well as the amount of available stroke of the pushrod. This is important as the stroke of pushrod 56, and, thus, the rotation of camshaft 36, is affected by a number of factors, including the amount of air pressure in air chamber 54, the stiffness of components in drum brake assembly 10, the thermal expansion of brake drum 30, and the initial running clearance between brake linings 33 of brake shoes 32 and inner surface 31 of the brake drum when the brake assembly is not actuated. For drum brake assembly 10, air chamber 54 typically has a maximum stroke capability for pushrod 56 of approximately 3 inches. Once the stroke of pushrod 56 is within approximately 0.5 inches of the maximum stroke, the force generated by air chamber 54 loses efficiency such that all efficiency is lost at maximum stroke. Thus, determination and prediction of the actual stroke of pushrod 56 during actuation of drum brake assembly 10, as well as determination of whether the brake assembly is approaching the limit of the available stroke, is critical to ensuring air chamber 54 is capable of creating enough air pressure to produce sufficient braking. In addition, the relative stroke between multiple brake assemblies 10 sharing an air system control circuit (not shown) may be compared in order to detect undesirable variation in the stroke for the same air pressure within respective air chambers 54, which may potentially be indicative of a failure of brake drum 30.

Determination and prediction of the rotation of camshaft 36 also allows determination and/or prediction of the position of rollers 40 along S-cam 38. In particular, as brake linings 33 of brake shoes 32 and/or inner surface 31 of brake drum 30 wear, manual and/or automatic adjustment of slack adjuster 50 will gradually rotate camshaft 36, and, thus, S-cam 38, causing progressive movement and positioning of rollers 40 along the surface of the S-cam, as is known. The position of rollers 40 also varies depending on the thickness of brake linings 33. For instance, there are typically two different thicknesses of brake linings 33 available that can be utilized with brake spider 34 and S-cam 38: a standard service version and a thicker extended service version. As a result, once slack adjusters 50 have established the running clearance between new, cold brake linings 33 and inner surface 31 of brake drum 30, rollers 40 may be positioned at different locations along S-cam 38 depending upon whether a standard or extended service version of the brake lining is being used. More specifically, standard service versions of brake lining 33 will cause rollers 40 to be positioned further along S-cam 38, and, thus, nearer to the tips of the S-cam, than extended service versions.

Accordingly, and with particular reference to FIGS. 3A-H, new, cold, standard service and extended service brake linings 33 may result in a different approximate rotation angle α of camshaft 36 relative to the zero-starting point of S-cam 38, as best shown in FIGS. 3B and 3A, respectively. More specifically, camshaft 36 may rotate an angle α of approximately 29 degrees (FIG. 3D) and 17 degrees (FIG. 3C) in new, cold, standard service and extended service brake linings 33, respectively, to an adjusted running clearance position with some variation based on the manufacturing of components of drum brake assembly 10. Heating and expansion of brake drum 30 may potentially cause deflection of other components of drum brake assembly 10, thereby increasing the amount of rotation of camshaft 36 during operation. At the end of service-life, cold standard service and extended service brake linings 33 may result in an approximate rotation angle α of camshaft 36 relative to the zero-starting point of S-cam 38 of about 143 degrees (FIG. 3F) and 153 degrees (FIG. 3E), respectively, until contact occurs between the brake linings and inner surface 31 of brake drum 30. Rollers 40 typically reach the tips of S-cam 38 in both standard service and extended service brake linings 33 with an approximate rotation angle α of camshaft 36 relative to the zero-starting point of the S-cam of about 168 degrees, as best shown in FIGS. 3G-H. Consequently, at the end of service life of both standard and extended service brake linings 33, rollers 40 may be at different angles but are still relatively close to the tips of S-cam 38. Positioning of rollers 40 near the tips of S-cam 38 may also be affected by significant thermal expansion of brake drum 30 caused by excessive heat and/or normal or excessive wear of brake linings 33 and/or inner surface 31 of the brake drum, and is generally an indication that the brake linings and/or brake drum needs to be replaced. In order to prevent rollers 40 from potentially passing over the tips of S-cam 38 and falling into the pocket on the back side of the S-cam, commonly referred to as S-cam flip, and potentially causing a loss of functionality of drum brake assembly 10, it is advantageous to provide a notification or warning as the rollers approach the tips of the S-cam, preferably at a rotation angle α of camshaft 36 that is less than 168 degrees. In order to allow time to schedule routine maintenance of drum brake assembly 10, it is also advantageous to provide a notification of the approaching end of service-life for brake shoes 32, brake linings 33, and/or brake drum 30 at a rotation angle α of camshaft 36 that is less than 143 degrees or 153 degrees for standard service or extended service versions of the brake linings, respectively. Thus, in order to determine the need for servicing and maintenance of drum brake assembly 10 and to provide notifications, it is desirable to be able to determine and/or predict the amount of rotation of camshaft 36 during actuation of drum brake assembly 10, relative rotation of the camshaft between brake assemblies, and total rotation of the camshaft indexed by slack adjuster 50 during adjustment.

Furthermore, determination and/or prediction of rotation of camshaft 36 may be coupled with simultaneous acquisition of pressure data of air chamber 54 using a microprocessor, central electronic module, or electronic control unit (ECU) (not shown) allowing for a generally more accurate prediction of the end of service-life of brake shoes 32, brake linings 33, and/or brake drum 30, thereby allowing for the use of less conservative notification timing and preventing premature maintenance of drum brake assembly 10. In particular, a low actuation pressure in air chamber 54 combined with rotation angle α of camshaft 36 generally increases accuracy of predictions. More particularly, low actuation pressure in air chamber 54 and rotation angle α of camshaft 36 may be combined with the time between actuation events of drum brake assembly 10 to allow determination of the temperature of brake drum 30, thereby allowing additional refinement and accuracy of end of service-life predictions using simple kinematics modeling of brake shoes 32, brake linings 33, and the brake drum.

Prior art sensor mounting arrangements (not shown) have been utilized to determine and/or predict rotation of camshaft 36, and, thus, the stroke of pushrod 56. However, the prior art sensor mounting arrangements have disadvantages, drawbacks, and limitations. In particular, numerous manufacturers have designed prior art sensor mounting arrangements utilizing proprietary sensing devices integrated into specific styles of slack adjuster 50. While third party sensing devices are available, such third-party sensing devices typically only work with specific commercially-available styles of slack adjuster 50 or are only adaptable for attachment directly to S-cam 38 or splined end 35 of camshaft 36 with modification, axle 12, or other components of the axle/suspension system. More particularly, the prior art sensor mounting arrangements are generally positioned in areas exposed to potential impact damage; areas that typically interfere with or add complexity to assembly, disassembly, and maintenance of drum brake assembly 10; and/or areas that potentially expose the sensing devices to environmental conditions, such as extreme temperatures, that potentially negatively affect the accuracy and service-life of the sensing device. In addition, some prior art sensor mounting arrangements have limited functionality such that the sensing devices may be only capable of indicating the length of the stroke of pushrod 56 generated by air chamber 54 but fail to predict wear limits of brake lining 33 or available lift of S-cam 38. The camshaft rotation sensor mounting arrangement, according to the present invention, overcomes the disadvantages, drawbacks, and limitations of prior art sensor mounting arrangements An exemplary embodiment camshaft rotation sensor mounting arrangement 70 (FIGS. 4-11), according to the present invention, may be utilized with any suitable brake assembly, such as drum brake assembly 10, described above.

Figure 6:
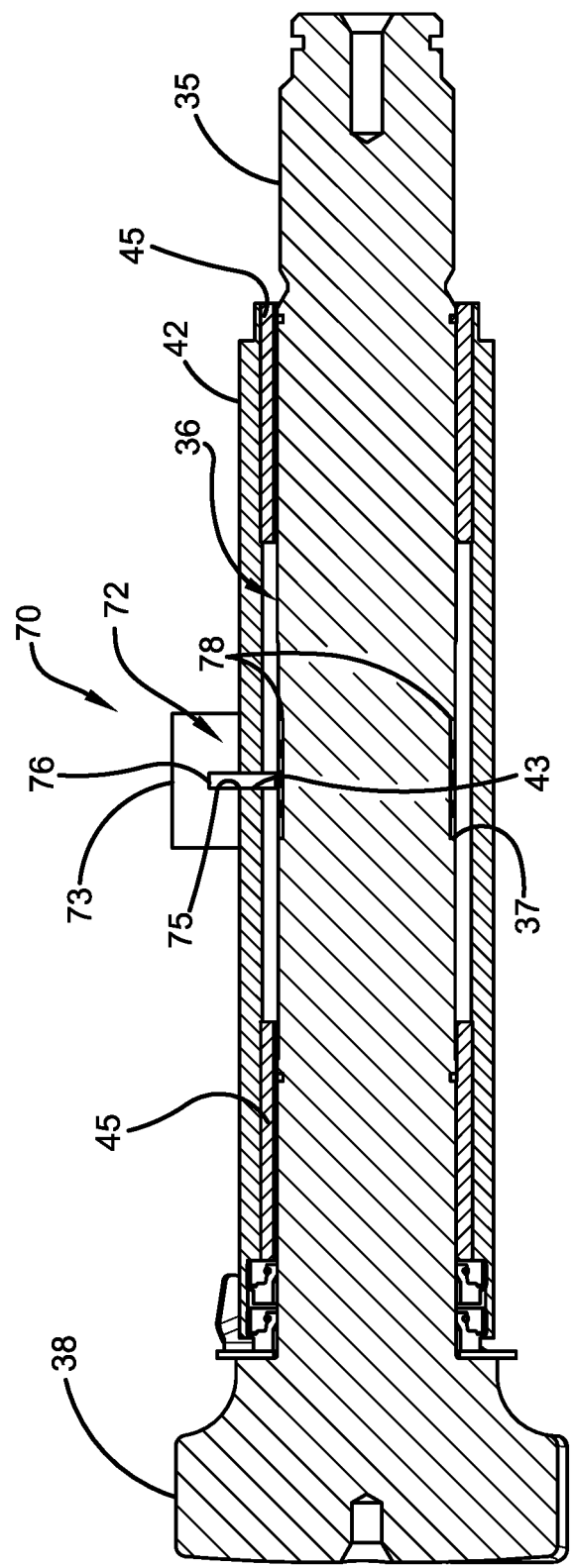
FIG. 6 is an elevational view, in section, of the exemplary embodiment sensor mounting arrangement shown in FIGS. 4-5 mounted on the cam tube.
Figure 7:
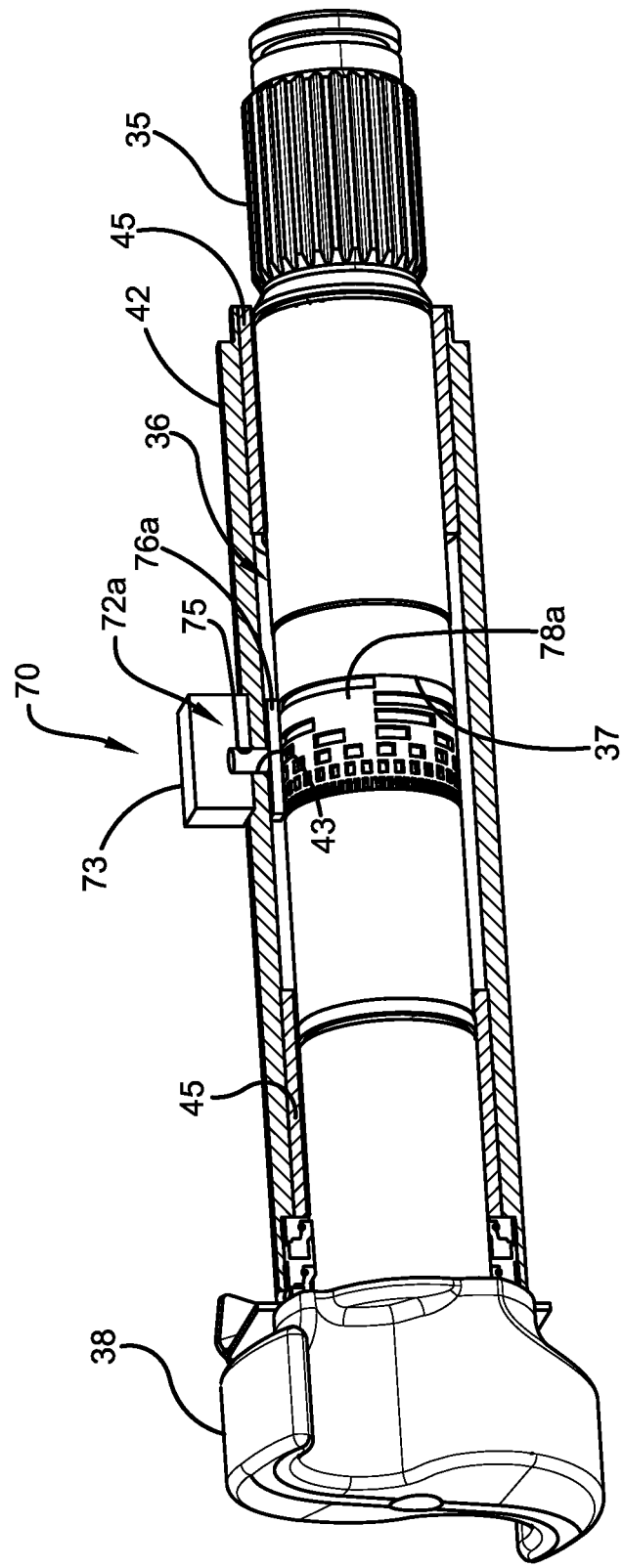
FIG. 7 is perspective view, partially in section, of the exemplary embodiment sensor mounting arrangement shown in FIGS. 4-6, showing a variation of the sensor assembly utilizing a Hall effects sensor.

In particular, and in accordance with an important aspect of the present invention, sensor mounting arrangement 70 includes an outer shell or protective housing 73 and a sensor assembly 72 (FIG. 6). Housing 73 may be any suitable shape, such as cuboid, cylindrical, or the like, and may be formed from any suitable material, such as metal or composite, using any suitable method, such as stamping. Housing 73 may be disposed externally of and at least partially mounted on cam tube 42 by any suitable means, such as weldments, threaded fittings, fasteners, and the like. In particular, housing 73 may include an opening 75 (FIG. 6) aligned with an opening 43 formed in the outer surface of cam tube 42 and extending through to the inner surface of the cam tube. Opening 43 may be located at any suitable axial location along cam tube 42, but is preferably located at a point on the cam tube that is midway between S-cam 38 and splined end 35 of camshaft 36. Opening 75 of housing 73 may engage with opening 43 of cam tube 42, such as by threaded connection, to form an interface between the housing and cam tube. It is contemplated that a seal (not shown) may be formed about the interface to inhibit the ingress of water, chemicals, and/or debris into cam tube 42 and/or housing 73. Housing 73 may be disposed on cam tube 42 and adjacent axle/suspension system 5 such that the cam tube and axle/suspension system provide protection from potential impact damage and debris. Housing 73 may be disposed over or at least partially encapsulate at least a portion of sensor assembly 72 and/or other electronic and/or mechanical components, such as a wireless transmitter (not shown), ECU (not shown), battery (not shown), energy harvesting device (not shown), or the like, to protect the sensor assembly and/or other components from water, chemicals, debris, environmental conditions, and impacts. In addition, mounting housing 73 on cam tube 42 places sensor assembly 72 and other electronic and/or mechanical components in a location that is remote and protected from heat-generating areas of drum brake assembly 10, such as brake drum 30 and brake shoes 32.

Sensor assembly 72 may also include a locator 74 extending from housing 73 axially along cam tube 42 in parallel with central tube 14 of axle 12, and engaging an opening in cam tube bracket 44. The engagement between locator 74 and cam tube bracket 44 allows for determination of the rotational position of cam tube 42 relative to the centerline of drum brake assembly 10 between the center of camshaft 36 and the center of brake drum 30. It is also contemplated that cam tube 42 may be welded to a mounting flange (not shown) for attachment to brake spider 34. In such a configuration, the mounting flange only has a single orientation relative to brake spider 34 such that the rotational positioning of cam tube 42 can easily be ascertained during the welding process such that the use of locator 74 is not required.

In accordance with another important aspect of the present invention, sensor assembly 72 includes a detector 76 (FIG. 6) disposed adjacent to opening 75 of housing 73 or at least partially disposed in cam tube 42 and oriented to a zero-starting point of S-cam 38. The zero-starting point of S-cam 38 is the position of camshaft 36 in which rollers 40 would be at the narrowest point between the two halves of the sigmoidal head of the S-cam, as is known. Detector 76 may utilize any suitable type of sensor or sensing device, such as a Hall effects sensor (FIG. 7), induction sensor (FIG. 8), eddy current sensor (FIGS. 9-13), anisotropic magnetoresistance sensor (not shown), or the like, and may be positioned such that the detector is in-line with the centerline between camshaft 36 and brake drum 30 or may be positioned perpendicular to the centerline between the camshaft and the brake drum. Detector 76 may be configured to communicate electronically via wired or wireless communication with an ECU (not shown) that is configured to receive electronic signals. In particular, detector 76 may include a wired connection (not shown) utilizing a two- or three-wire connection. More particularly, detector 76 may utilize a two-wire connection having a first wire to provide power and a second wire for grounding with electronic signals being wirelessly transmitted. Alternatively, detector 76 may utilize a three-wire connection having a first wire for power, a second wire for grounding, and a third wire for transmitting electronic signals. In such a configuration, the third wire for transmitting electronic signals may be directly or indirectly connected to the ECU, such that the third wire may be connected to an antenna or transmitter for wireless transmission to the ECU or to a receiver in electronic communication with the ECU in order to prevent disruption of electronic communication due to signal interference by components of the heavy-duty vehicle that may potentially block or limit transmission from areas near drum brake assembly 10.

It is contemplated that electric and/or electronic components of sensor assembly 72, such as detector 76, may utilize a battery (not shown) as a source of power. However, because signals from actuation of drum brake assembly 10 generally transmit during short periods of actuation, the timing of which is unknown, wireless transmission would generally require constant monitoring and, thus, constant electric power draw. As a result, utilization of wireless transmission may potentially result in detector 76 and/or other components of sensor assembly 72 depleting power from the battery. Thus, sensor mounting arrangement 70 may also include an energy harvesting device (not shown) electronically connected with sensor assembly 72 and at least partially encapsulated within housing 73. The energy harvesting device may provide and maintain sensor assembly 72 at an acceptable voltage as well as provide current to and maintain the charge in the battery. It is also contemplated that an external charging wire (not shown) may be connected to sensor assembly 72 to maintain a charge of a battery or otherwise power components of the sensor assembly, such as detector 76.

In accordance with yet another important aspect of the present invention, sensor assembly 72 also includes at least one target 78 (partially shown) disposed about and at least partially encompassing camshaft 36. More particularly, target 78 may be positioned on the surface of camshaft 36 in any suitable axial location along the camshaft, such as at a position that is approximately midway between S-cam 38 and inboard splined end 35 or, more preferably, midway between cam shaft bushings 45. Target 78 may be disposed within a groove 37 formed radially inward from and circumferentially about the exterior surface of camshaft 36. Groove 37 may be any suitable size and depth, but is preferably formed to be about 1.0 inch wide and about 0.12 inches deep. It is also contemplated that multiple targets 78 may be utilized depending upon the type of detector 76 utilized in sensor assembly 72. In such a configuration, targets 78 may have generally identical configurations and may be oriented such that the targets are in a circumferentially-spaced arrangement about camshaft 36 about 180 degrees apart. As a result, multiple targets 78 would be circumferentially positioned such that the corresponding zero-starting point of S-cam 38 would be correct irrespective of which roller 40 is associated with which pocket of S-cam 38.

Sensor assembly 72 of camshaft rotation sensor mounting arrangement 70 may have a plurality of configurations. One such variation is shown utilizing a Hall effect sensor in FIG. 7 as sensor assembly 72a.

Sensor assembly 72a includes a tubular or annular-shaped target 78a disposed within groove 37 of camshaft 36. Target 78a may be at least partially formed from or composed of a magnetic material, such as ferrous metal, circumferentially-spaced about the target, and thus about camshaft 36. Because target 78a incorporates magnetic materials in a circumferentially-spaced manner, sensor assembly 72a does not require the use of an ECU (not shown) to record a zero-starting point of S-cam 38. Thus, a loss of electric power to the ECU or sensor assembly 72a will not cause the zero-starting point to be reset or lost. The configuration of target 78a also allows the target to be pre-positioned on camshaft 36 as a subassembly prior to final assembly of drum brake assembly 10, thereby simplifying installation and maintenance of the brake assembly. For instance, target 78a may be composed of magnetic material suspended within a stretchable elastomer in a circumferentially-spaced arrangement. Such a configuration of target 78a allows the target to be radially stretched or expanded during assembly and disposed about groove 37 of camshaft 36, then relaxed to engage the camshaft within the groove. Alternatively, target 78a may be formed as a pair of flexible plastic split- or two-piece rings in which magnetic material may be suspended in a circumferentially-spaced arrangement. As a result, during assembly, the split- or two-piece rings of target 78a can be opened or separated, positioned about camshaft 36 and within groove 37, and snapped together or joined. It is also contemplated that any suitable adhesive may be utilized to fix target 78a in a proper orientation about camshaft 36 relative to the zero-starting point of S-cam 38. Alternatively, target 78a may be formed with a timing detent (not shown) to allow orientation of the target relative to the zero-starting point of S-cam 38.

Sensor assembly 72a also includes a Hall effects sensor or detector 76a incorporating a Hall element capable of reacting to the magnetic field generated by target 78a, allowing for determination of the actual rotation angle α of camshaft 36 relative to the zero-starting point of S-cam 38. During operation, once drum brake assembly 10 is actuated, camshaft 36 rotates, rotating target 78a, thereby changing the distribution of magnetic material of the target positioned adjacent detector 76a. As a result, the Hall voltage generated by detector 76a changes, allowing for determination of the rotation angle α of camshaft 36 relative to the zero-starting point of S-cam 38 during actuation as well as the total rotation of the camshaft after indexing by slack adjuster 50 to account for loss of brake lining 33.

Thus, exemplary embodiment camshaft rotation sensor mounting arrangement 70, according to the present invention, provides housing 73 and sensor assembly 72a that are separate from and usable with any commercially available slack adjuster 50, are positioned away from potential impact damage and environmental exposure, and do not interfere with or add complexity to maintenance and assembly of drum brake assembly 10, while providing detector 76a and target 78a that are at least partially disposed within cam tube 42 and accurately monitor rotation of camshaft 36 during actuation of the brake assembly and total rotation of the camshaft during indexing by the slack adjuster to account for wear of brake linings 33.

Figure 8:
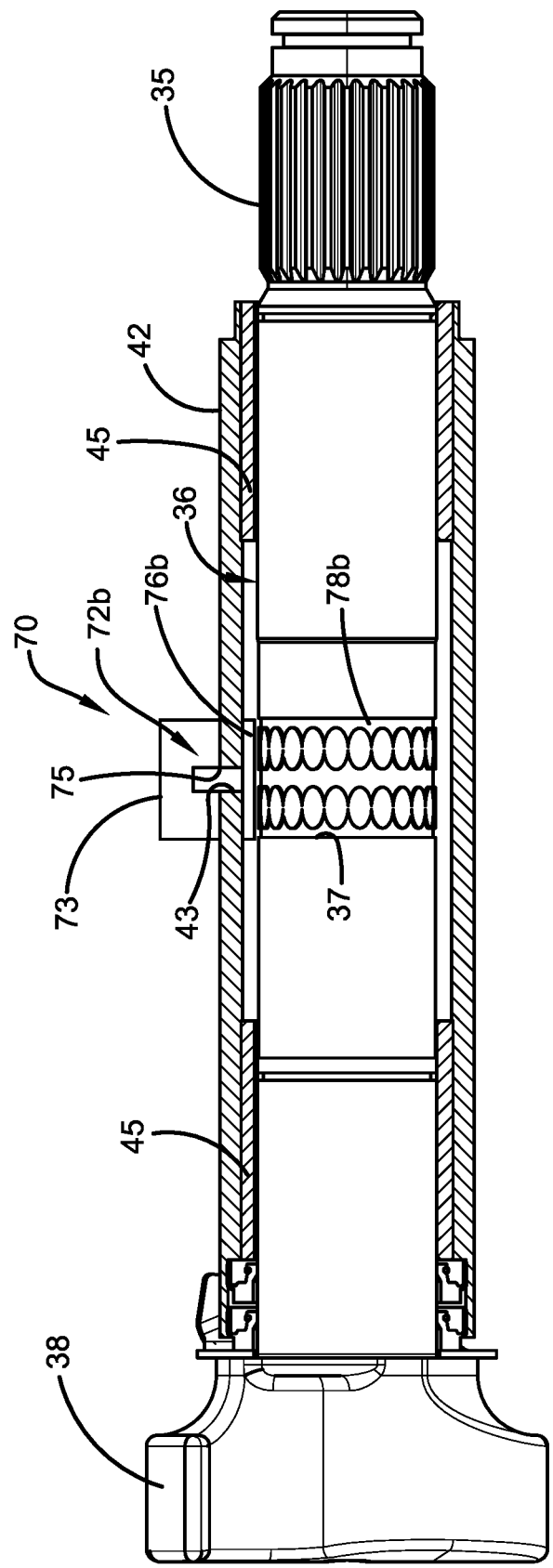
FIG. 8 is an elevational view, partially in section, of the exemplary embodiment sensor mounting arrangement shown in FIGS. 4-6, showing a variation of the sensor assembly utilizing an induction sensor.

Another sensor assembly 72b utilized in exemplary embodiment camshaft mounting arrangement 70, according to the present invention, is shown in FIG. 8 and described below.

Sensor assembly 72b includes an annular flexible induction sensor or detector 76b and a tubular or annular target 78b. Detector 76b may be at least partially disposed within housing 73 and formed from a series of wires arranged in a suitable pattern, such as a crisscrossing grid, placed on or embedded in a thin, flexible plastic film disposed within cam tube 42. Detector 76b may at least partially encompass camshaft 36, extending about the camshaft at least 160 degrees, and may be spaced a distance radially-outward from the camshaft.

Target 78b may be formed as a curved substrate having a combination of conductive material, such as metal, and a non-conductive material, such as plastic, circumferentially arranged in sections. Target 78b may be disposed about and at least partially encompass and/or engage camshaft 36 within groove 37 such that detector 76b is in close radial proximity to the target. It is contemplated that sensor assembly 72b may also include a pad (not shown) formed from any suitable flexible and/or resilient material, such as rubber, closed-cell foam, rubber with relief pockets, or the like, and disposed between detector 76b and the inner surface of cam tube 42 to provide contact pressure and maintain close radial proximity between the detector and target 78b.

During assembly, detector 76b may be at least partially disposed within cam tube 42. The flexible plastic film of detector 76b may be configured to allow the inner diameter of the detector to be smaller than the outer diameter of camshaft 36 and/or target 78b. Once target 78b is disposed about and is seated within groove 37 of camshaft 36, the camshaft may be inserted into cam tube 42 such that detector 76b flexes away or moves radially outward. As a result, detector 76b allows camshaft 36 to be installed within cam tube 42 while providing appropriate contact pressure between the detector and target 78b.

During operation, when drum brake assembly 10 is actuated, camshaft 36 rotates, rotating target 78b. Rotation of target 78b causes the conductive metal and non-conductive material of the target to pass beneath detector 76b, inducing an electric current that varies with rotation of camshaft 36 and is transduced into an electronic signal. As a result, sensor assembly 72b can accurately determine the rotation angle α of camshaft 36 relative to the zero-starting point of S-cam 38 based on the variation of the current and signal generated by detector 76b. It is also contemplated that sensor assembly 72b could utilize a pair of detectors 76b in an axially adjacent or side-by-side arrangement. In such an arrangement, each detector 76b would be associated with a separate target 78b disposed about camshaft 36 such that the conductive material of one of the targets is circumferentially-spaced a predefined distance from the conductive material of the other of the targets. As a result, such a configuration would allow sensor assembly 72b to utilize a larger detector arc without impacting the installation of camshaft 36 and/or orientation of S-cam 38 relative to rollers 40, thereby allowing installation of the camshaft with S-cam 38 in any suitable orientation.

Thus, exemplary embodiment camshaft rotation sensor mounting arrangement 70, according to the present invention, provides housing 73 and sensor arrangement 72b that are separate from and usable with any commercially available slack adjuster 50, are positioned away from potential impact damage and environmental exposure, and do not interfere with or add complexity to maintenance and assembly of drum brake assembly 10, while providing detector 76b and target 78b that are at least partially disposed within cam tube 42 and accurately monitor rotation of camshaft 36 during actuation of the brake assembly and total rotation of the camshaft during indexing by the slack adjuster to account for wear of brake linings 33.

Figure 9:
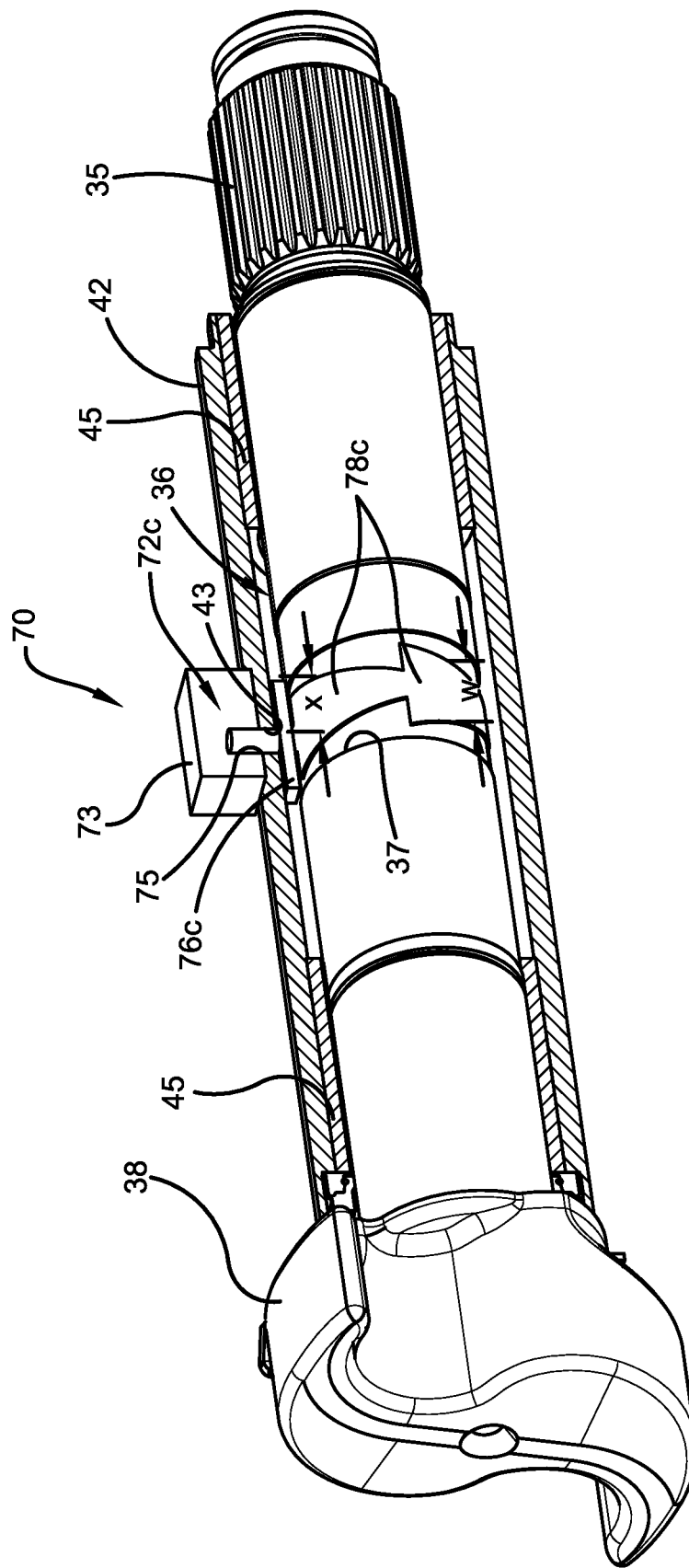
FIG. 9 is a perspective view, partially in section, of the exemplary embodiment sensor mounting arrangement shown in FIGS. 4-6, showing a variation of the sensor assembly utilizing an eddy current sensor.
Figure 10:
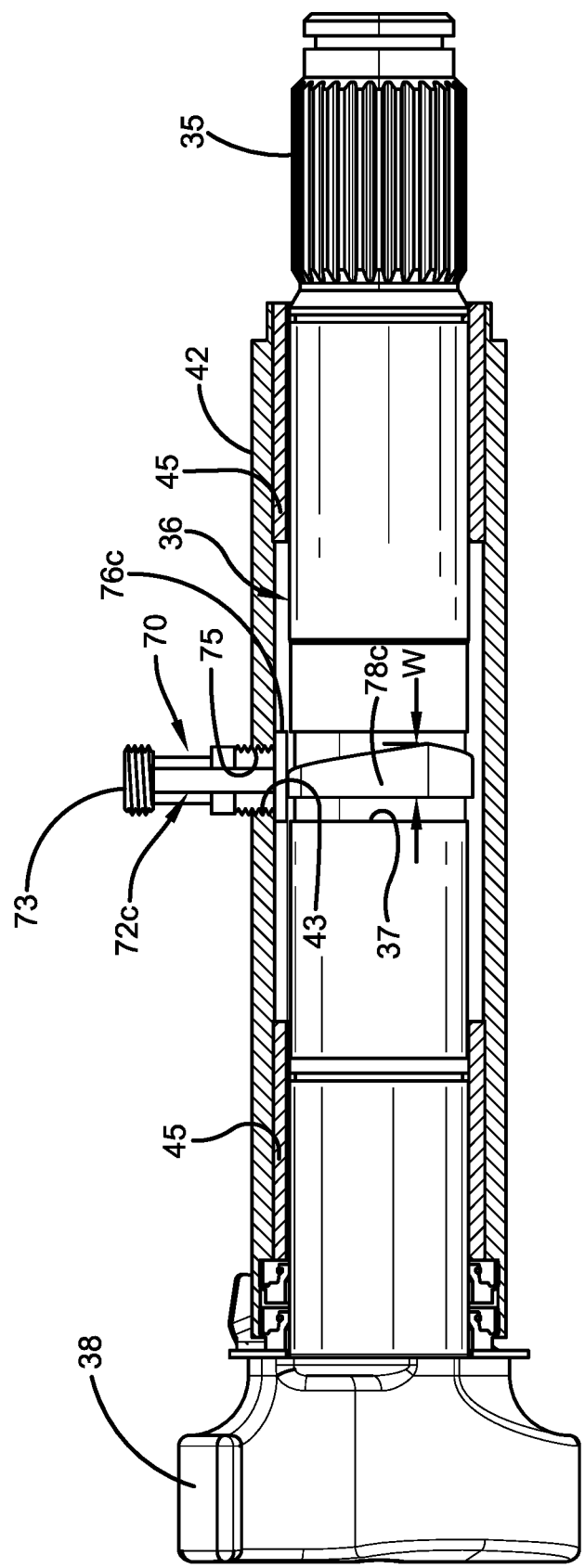
FIG. 10 is an elevational view, partially in section, of the exemplary embodiment sensor mounting arrangement shown in FIG. 9, showing the sensor assembly utilizing an alternative target and housing.
Figure 11:
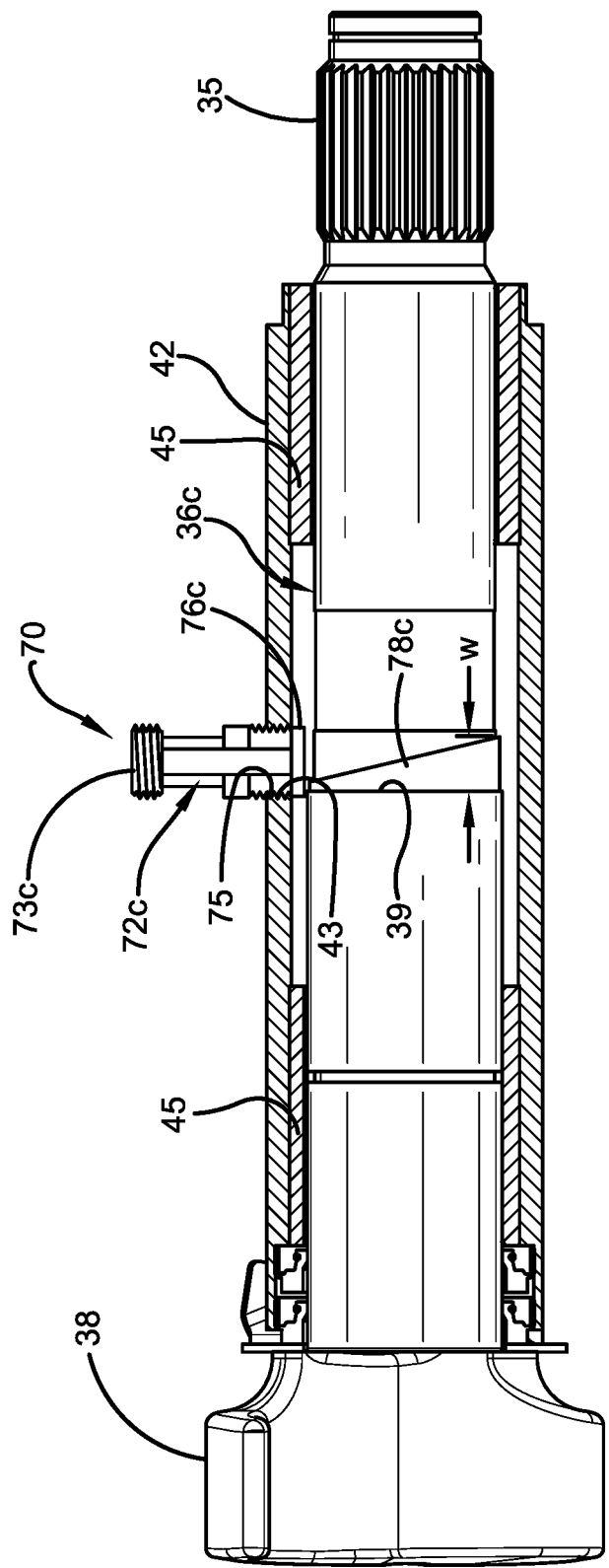
FIG. 11 is an elevational view, partially in section, of the exemplary embodiment sensor mounting arrangement shown in FIG. 10, showing the alternative target disposed about an alternative camshaft.
Figure 12:
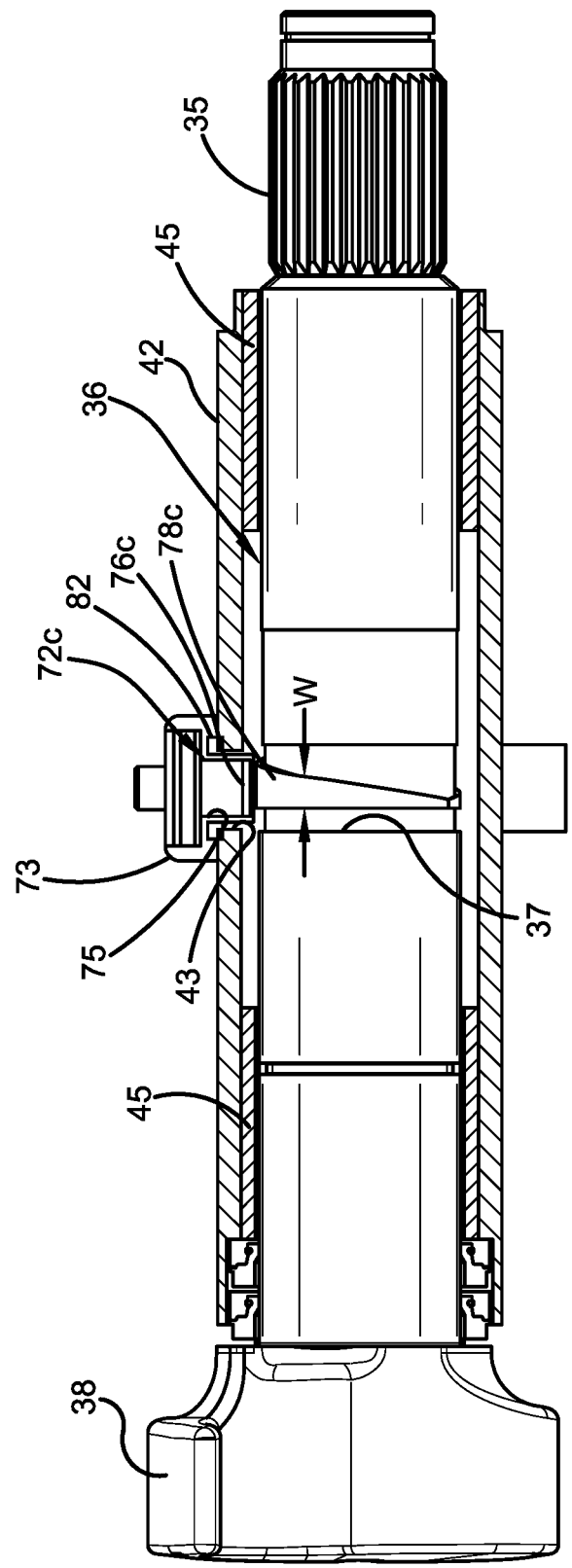
FIG. 12 is an elevational view, partially in section of the exemplary embodiment sensor mounting arrangement shown in FIG. 9 showing the detector in an alternative position relative to the cam tube.

Another sensor assembly 72c utilized in exemplary embodiment camshaft mounting arrangement 70, according to the present invention, is shown in FIG. 9 and described below.

Sensor assembly 72c includes an eddy current sensor or detector 76c at least partially disposed within housing 73 and at least partially disposed within cam tube 42. More specifically, detector 76c may project partially into cam tube 42, such as through aligned openings 75, 43 of housing 73 and the cam tube, respectively, and extend into the cam tube. It is also contemplated that detector 76c may be disposed within an alternative housing 73c (FIG. 10) and at least partially within cam tube 42.

It is also contemplated that detector 76c may be disposed entirely within housing 73 and adjacent opening 43 of cam tube 42. In such a configuration, and with particular reference to FIG. 12, detector 76c may be enclosed within a portion of housing 73 that extends through opening 43 and into cam tube 42. Housing 73 may have a portion interposed between detector 76c and cam tube 42 to shield the detector from pressurized grease within the cam tube without disrupting operation of the detector. A seal 82 may be at least partially disposed within opening 43, using any suitable method, such as an interference fit, at the interface between housing 73 and the opening in order to prevent egress of pressurized grease from the cam tube and ingress of water, chemicals, and/or debris. Seal 82 may be formed from any suitable material, such as elastomer, with any suitable shape, such as a cylinder, to allow an interference fit between opening 43, housing 73, and the seal in order to prevent egress of pressurized grease from and/or ingress of water, chemicals, and/or debris into cam tube 42.

Figure 13:
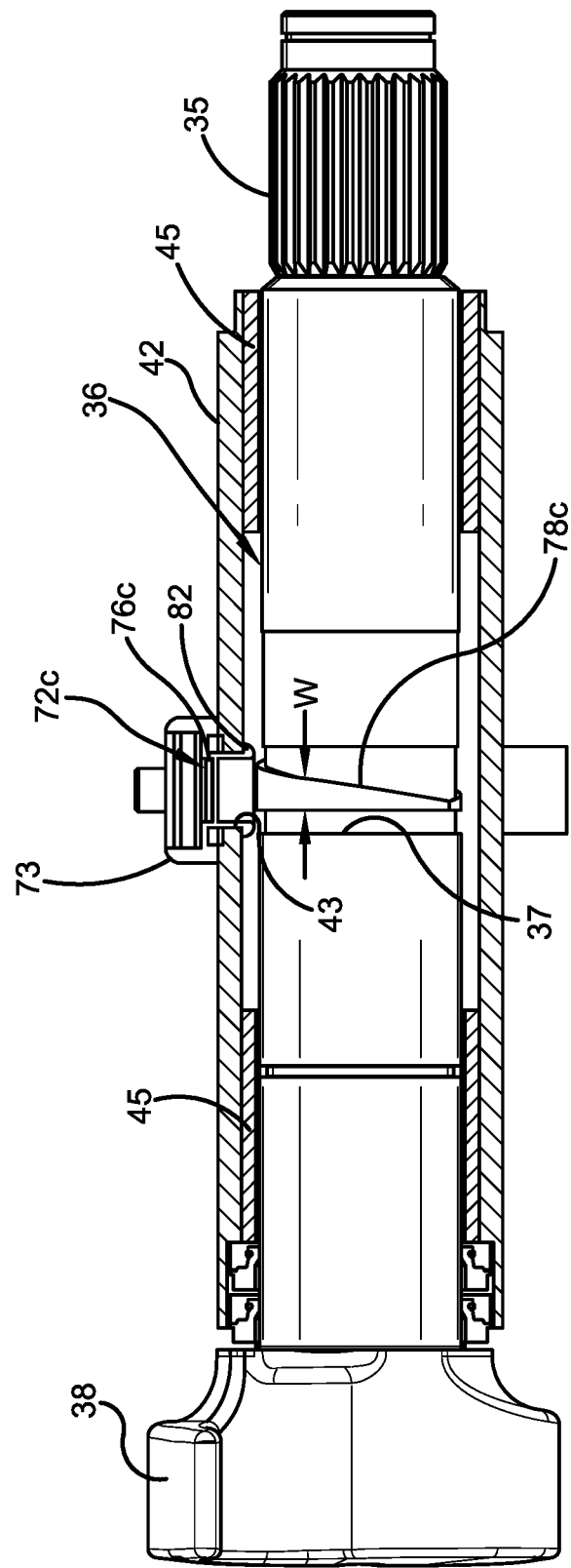
FIG. 13 is an elevational view, partially in section of the exemplary embodiment sensor mounting arrangement shown in FIG. 9 showing the detector in a different alternative position relative to the cam tube.

Alternatively, and with particular reference to FIG. 13, detector 76c may be disposed within housing 73 and adjacent to opening 43 of cam tube 42. In such a configuration, seal 82 may be formed as a plug engaging cam tube 42 and disposed with an interference fit within opening 43 and interposed between detector 76c and camshaft 36. Seal 82 may act to not only prevent ingress of water, chemicals, and/or debris into cam tube 42, but may also protect detector 76c from potential dislodgement or damage from the egress of pressurized grease from the cam tube into housing 73.

Sensor assembly 72c also includes a target 78c disposed about and at least partially encompassing camshaft 36 within groove 37. Target 78c may be formed with an annular shape having a variable axial width W. More specifically, target 78c may be formed with any suitable axial profile or shape, such as a triangle or the like, such that axial width W varies about the circumference of the target. Alternatively, target 78c may have a pair of axial profiles, as best seen in FIG. 9, with respective axial widths W, X that vary in a circumferentially-spaced arrangement about 180 degrees apart about the circumference of the target and camshaft 36. Target 78c may be formed from any suitable conductive material, such as metal, and disposed within groove 37 of camshaft 36 by any suitable means, such as press fit. It is contemplated that target 78c may be utilized with and disposed about an alternative camshaft 36c (FIG. 11) formed with a shoulder 39. In such a configuration, target 78c may be disposed about camshaft 36c and seated against shoulder 39. It is also contemplated that target 78c may be formed from a flat piece of conductive material and molded or shaped about camshaft 36 within groove 37 such that the ends of the target may be joined by any suitable method, such as crimping.

During operation, when drum brake assembly 10 is actuated, camshaft 36 or camshaft 36c rotates, rotating target 78c. As target 78c rotates, axial width W of the target adjacent or apparent to detector 76c changes, generating an eddy current that varies in relation to the axial width, thereby allowing sensor assembly 72c to accurately determine rotation angle α of camshafts 36, 36c relative to the zero-starting point of S-cam 38.

Thus, exemplary embodiment camshaft rotation sensor mounting arrangement 70, according to the present invention, provides housing 73 and sensor arrangement 72c that are separated from and usable with any commercially available slack adjuster 50, are positioned away from potential impact damage and environmental exposure, and do not interfere with or add complexity to maintenance and assembly of drum brake assembly 10, while providing detector 76c and target 78c that are at least partially disposed within cam tube 42 and accurately monitor rotation of camshafts 36, 36c during actuation of the brake assembly and total rotation of the camshaft during indexing by the slack adjuster to account for wear of brake lining 33.

It is contemplated that any portion of sensor assembly 72 housed within cam tube 42 may be located in different axial positions along the cam tube between S-cam 38 and splined end 35 or have different orientations than those shown and described without changing the overall concept or operation of the present invention. It is also contemplated that camshaft rotation sensor mounting arrangement 70 of the present invention may utilize any type of sensor technology known in the art, such as an anisotropic magnetoresistance, variable resistance, potentiometry, and the like, without changing the overall concept or operation of the present invention. It is yet also contemplated that camshaft rotation sensor mounting arrangement 70 of the present invention may be housed completely within cam tube 42 without changing the overall concept or operation of the present invention. It is contemplated that camshaft rotation sensor mounting arrangement 70 of the present invention could be utilized in braking systems on heavy-duty vehicles having more than one axle and/or one or more than one wheel per wheel end assembly, without changing the overall concept or operation of the present invention. It is further contemplated that camshaft rotation sensor mounting arrangement 70 could be utilized with all types of heavy-duty vehicle drum braking systems without changing the overall concept or operation of the present invention.

It is contemplated that different arrangements and materials of camshaft rotation sensor mounting arrangement 70 other than those shown and described, could be utilized without changing the overall concept or operation of the present invention. It is also contemplated that other methods and order of assembly could be utilized to assemble or install sensor assembly 72, cam tube 42, and camshaft 36, 36c without changing the overall concept or operation of the present invention.

Accordingly, camshaft rotation sensor mounting arrangement 70 of the present invention is simplified; provides an effective, safe, inexpensive, and efficient structure and method, which achieves all the enumerated objectives; provides for eliminating difficulties encountered with prior art sensor mounting arrangements; and solves problems and obtains new results in the art.

In the foregoing description, certain terms have been used for brevity, clarity, and understanding, but no unnecessary limitations are to be implied therefrom beyond the requirements of the prior art because such terms are used for descriptive purposes and are intended to be broadly construed. Moreover, the description and illustration of the invention is by way of example, and the scope of the invention is not limited to the exact details shown or described.

Having now described the features, discoveries, and principles of the invention; the manner in which the camshaft rotation sensor mounting arrangement of the present invention is used and installed; the characteristics of the construction, arrangement, and method steps; and the advantageous, new, and useful results obtained; the new and useful structures, devices, elements, arrangements, process, parts, and combinations are set forth in the appended claims.

What is claimed is:

1. A sensor mounting arrangement for a drum brake assembly of a heavy-duty vehicle, the sensor mounting arrangement comprising:
    a sensor assembly mounted on a cam tube of said drum brake assembly, said cam tube being formed with an opening;
    said sensor assembly including a detector and a target;
    said detector being at least partially disposed in or adjacent to said opening of the cam tube and comprising a Hall effect element in close proximity to said target; and
    the target comprising a stretchable elastomer with a magnetic material being formed as an annular shape and disposed about an outer surface of a camshaft of the drum brake assembly;
    wherein said magnetic material is suspended within said elastomer and distributed in a circumferentially-spaced arrangement about the target.

2. A sensor mounting arrangement for a drum brake assembly of a heavy-duty vehicle, the sensor mounting arrangement comprising:
    a sensor assembly mounted on a cam tube of said drum brake assembly, said cam tube being formed with an opening;
    said sensor assembly including a housing connected to the cam tube, a detector, a target, and a seal;
    said housing engaging and forming an interface with the opening of the cam tube;
    said detector comprising an eddy current sensor in close proximity to said target and being at least partially disposed in or adjacent to said opening of the cam tube and at least partially disposed within the housing;
    said seal formed about said interface to prevent the ingress of water, chemicals, and debris into the housing and the cam tube; and
    the target being formed from a conductive material with an annular shape having an axial profile with an axial width that varies about the circumference of the target, the target being disposed about an outer surface of a camshaft of the drum brake assembly.

3. The sensor mounting arrangement of claim 2, said target having a pair of axial profiles;
    wherein each of said pair of axial profiles is circumferentially-spaced 180 degrees apart about said camshaft, each of the pair of axial profiles having a respective axial width that varies circumferentially about the camshaft.

4. A sensor mounting arrangement for a drum brake assembly of a heavy-duty vehicle, the sensor mounting arrangement comprising:

a sensor assembly mounted on a cam tube of said drum brake assembly, said cam tube being formed with an opening;

said sensor assembly including a detector, a target, and a flexible pad;

said detector comprising an induction sensor in close proximity to said target, the detector being at least partially disposed in or adjacent to said opening of the cam tube;

said induction sensor comprising wires arranged on a flexible film at least partially encompassing the target;

said target comprising a curved substrate having a combination of conductive and non-conductive material arranged in sections about the circumference of the target, the target being disposed about an outer surface of a camshaft of the drum brake assembly; and said flexible pad being disposed between said cam tube and said flexible film of the detector to provide contact pressure to the detector to maintain close proximity between the detector and said target.

* * * * *